3,316,151
METHODS AND COMPOSITIONS FOR INDUCING TRANQUILIZING, MUSCLE RELAXANT AND DEPRESSANT ACTIVITY

Albert Lawrence Green, Welwyn Garden City, and George Lawrence Willey, Harpenden, England, assignors to Smith Kline & French Laboratories, Philadelphia, Pa., a corporation of Pennsylvania
No Drawing. Filed June 15, 1964, Ser. No. 375,332
Claims priority, application Great Britain, June 17, 1963, 24,116/63
7 Claims. (Cl. 167—65)

This invention relates to a new method of inducing pharmacodynamic activity by a drug action on the central nervous system. More specifically this invention relates to a method of inducing tranquilizing activity, central nervous system depressant activity and muscle relaxant activity by administering internally an effective amount of a compound of the structure:

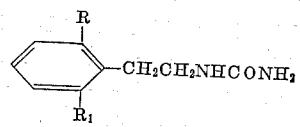

FORMULA I in which R and $R_1$ are methyl or ethyl.

The compounds of Formula I are, to the best of our knowledge, new compounds not previously described in the literature. These compounds are prepared by reaction of the corresponding xylylethyl amines with an alkali metal cyanate such as sodium cyanate. The amines used as starting material are produced by the following known route:

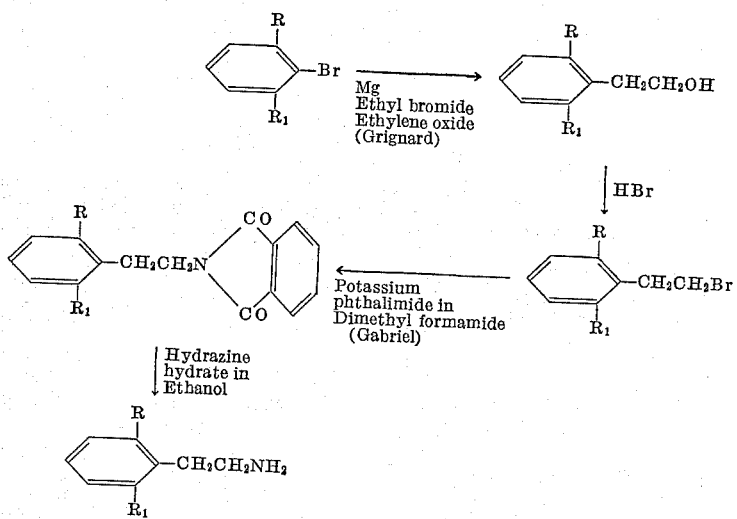

When the compounds of Formula I are administered internally, preferably orally, to animals the desired pharmacodynamic activity is induced, for example mild tranquilizing activity more specifically an anti-anxiety effect, depression and/or centrally induced muscle relaxant activity. The desirable effects are coupled with a remarkably low level of toxicity.

These useful results are illustrated by the fact that the minimum protective dose of 2,6-dimethylphenethylurea in the anti-anxiety test in mice (suppressed motor activity) is 60 mgm./kgm. In the fixed interval test in monkeys administration of this compound gives results qualitatively the same as those obtained by chlorpromazine but opposite from those obtained by similar compounds such as the phenethylurea, i.e., the fixed interval is decreased rather than increased. The effective dose in monkeys is 10 mg./kg. orally. In mice in an activity chamber the $DD_{50}$ (depressant dose) is 250 mgm./kgm. Ataxia appears in mice at 280 mgm./kgm. All these doses are oral. The $LD_{50}$ in male mice is 1,400 mgm./kgm.

One skilled in the art may choose a therapeutically effective but nontoxic dose of the compounds. For example the effective oral dose is from about 100–500 mgm./kgm. preferably 150–400 mgm./kgm. In the process as described the oral dose may be administered from 1–6 times daily and the most convenient unit dose is from about 100–600 mg. The dimethyl congener is the preferred compound.

It will be appreciated that for medicinal use, the pharmacodynamically active compounds of the invention are made up in accordance with well known pharmaceutical techniques into pharmaceutical compositions comprising as the essential active ingredient a compound of Formula I, in association with a non-toxic pharmaceutical carrier therefor. The carrier may be an orally ingestible container for the active ingredient, for example a hard or soft gelatin capsule, or it may be a pharmaceutically acceptable diluent or excipient of the kind normally used in the production of medicaments ready for use, for example maize starch, terra alba, lactose, calcium phosphate, gelatin, talcum, stearic acid, magnesium stearate and dextrin.

The compositions may be made up in a form suitable for parenteral or preferably oral administration. Thus the dosage unit when required for oral administration may take the form of, for example, a tablet, bolus, pill, packaged powder or encapsulated powder. The quantity of active ingredient in each dosage unit will be such that one or more units are required for each administration and varies somewhat with the weight of the animal to be treated.

The following examples illustrate the invention.

Example 1

2-(2',6'-xylyl)-ethylamine (0.1 mole), prepared from 2,6-dimethyl-bromobenzene as described hereabove, is dissolved in water (150 ml.) containing hydrochloric acid (0.1 mole). The resulting solution is heated to 80° C. and stirred while a solution of sodium cyanate (0.11 mole) is gradually added. Heating and stirring are continued for a further 30 minutes after the addition of the odium cyanate is completed and the resulting mixture is then allowed to cool. 2-(2′,6′-xylyl)-ethyl urea separates out as a crystalline product which is dried in vacuo and then recrystallized from aqueous ethanol to give a product having a M.P. of 173–174° C.

*Example 2*

Following the procedure of Example 1 but starting from 2-(2′,6′-diethylphenyl)-ethylamine, there is obtained 2-(2′,6′-diethylphenyl)-ethyl urea, M.P. 146° C.

*Example 3*

Tablets are prepared by known pharmaceutical techniques from the following ingredients:

| | Mg. per tablet |
|---|---|
| 2-(2′,6′-xylyl)ethyl urea | 100 |
| Terra alba | 200 |
| Maize starch | 18 |
| Icing sugar | 11 |
| Gelatin (used as aqueous 5% w./w. solution) | 4 |
| Dried starch | 11 |
| Talcum | 4 |
| Magnesium stearate | 2 |

The tablets may be scored so that, for example, a quarter or half the dose may be given.

What is claimed is:

1. A method for inducing tranquilizing, muscle relaxant and depressant activity comprising administering internally to animals a pharmaceutically effective amount of a compound of the formula;

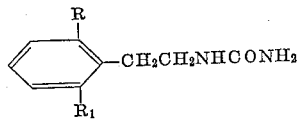

in which R and $R_1$ are members selected from the group consisting of methyl and ethyl.

2. The method of claim 1 in which the administration is oral.

3. The method of claim 1 in which the effective amount is about 100–500 mgm./kgm.

4. The method of inducing tranquilizing activity comprising administering internally to animals a pharmaceutically effective amount of 2-(2′,6′-xylyl)-ethylurea.

5. The method of claim 4 in which the administration is oral.

6. A capsule or tablet composition having pharmacodynamic activity comprising a pharmaceutical carrier and a compound of the formula;

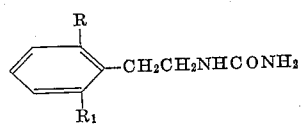

in which R and $R_1$ are members selected from the group consisting of methyl and ethyl.

7. The composition of claim 6 in which the compound is present in about 100–600 mg.

References Cited by the Examiner

UNITED STATES PATENTS

| 3,090,810 | 5/1963 | Berger | 167—65 |
| 3,164,632 | 1/1965 | Berger | 260—553 |

FOREIGN PATENTS 573,509  11/1945  Great Britain.

OTHER REFERENCES

Chem. Abstract, 51, page 6528H.

SAM ROSEN, *Primary Examiner.*

S. J. FRIEDMAN, *Assistant Examiner.*